(12) United States Patent
Sahlgren et al.

(10) Patent No.: US 7,373,046 B2
(45) Date of Patent: May 13, 2008

(54) OPTICAL ADD/DROP MULTIPLEXERS

(75) Inventors: Bengt Sahlgren, Saltsjö-Boo (SE); Johan Pejnefors, Danderyd (SE); Sten Helmfrid, Kista (SE)

(73) Assignee: Proximion Fiber Systems A.B., Kista (SE)

( * ) Notice: Subject to any disclaimer, the term of this patent is extended or adjusted under 35 U.S.C. 154(b) by 0 days.

(21) Appl. No.: 11/543,156

(22) Filed: Oct. 5, 2006

(65) Prior Publication Data
US 2007/0077006 A1    Apr. 5, 2007

(30) Foreign Application Priority Data
Oct. 5, 2005    (EP) ................... 05109265

(51) Int. Cl.
G02B 6/34    (2006.01)
(52) U.S. Cl. .................. 385/37; 385/31; 385/39; 385/40; 385/41; 385/47
(58) Field of Classification Search ............ 385/27, 385/31, 37, 39, 40, 41, 47
See application file for complete search history.

(56) References Cited

U.S. PATENT DOCUMENTS

| | | | |
|---|---|---|---|
| 4,950,885 A | | 8/1990 | Kershaw |
| 5,307,437 A | * | 4/1994 | Facq et al. ............. 385/124 |
| 7,076,133 B2 | * | 7/2006 | Ohlander et al. ......... 385/37 |

FOREIGN PATENT DOCUMENTS

| | | |
|---|---|---|
| EP | 0 506 546 A2 | 9/1992 |
| EP | 1 435 680 A2 | 7/2004 |
| WO | WO-01/06279 A1 | 1/2001 |
| WO | WO-02/06878 A1 | 1/2002 |
| WO | WO-02/054126 A1 | 7/2002 |
| WO | WO-02/103447 A1 | 12/2002 |
| WO | WO-2004/008208 A1 | 1/2004 |
| WO | WO-2005/054918 A1 | 6/2005 |

OTHER PUBLICATIONS

F.Marin et al., A folded Fabry-Perot cavity for optical sensing in gravitational wave detectors, Physics Letters A, 2003, vol. 309, pp. 15-23.

* cited by examiner

*Primary Examiner*—Frank G. Font
*Assistant Examiner*—Michael P. Mooney
(74) *Attorney, Agent, or Firm*—Birch, Stewart, Kolasch & Birch, LLP

(57) ABSTRACT

A spectrally selective optical coupler is disclosed, comprising a first and a second waveguide; an external resonator defined by at least a first and a second mirror; and a respective deflecting portion in each of said waveguides for coupling light between the waveguide and the external resonator. The waveguides are arranged between the mirrors adjacent to each other in a plane that is generally parallel to said mirrors; and the external resonator is designed such that a resonant mode within the external resonator overlaps the deflecting portion in the first and the second waveguide. The inventive coupler solves some limiting geometrical problems encountered in the prior art. A lateral extension of a mode in the external resonator overlapping both waveguides is obtained using a curved resonator mirror or refractive elements or portions within the resonator.

20 Claims, 3 Drawing Sheets

OPTICAL ADD/DROP MULTIPLEXERS

TECHNICAL FIELD

The present invention relates to the general field of optical couplers. More particularly, the invention relates to optical couplers for use as optical add/drop multiplexers.

TECHNICAL BACKGROUND

Optical add/drop multiplexers (OADMs) is typically considered to be a generic term for devices that have the functionality of selecting a subset of optical channels from an incoming optical fiber, or other optical transport medium, and dropping the light carrying these channels into a second optical fiber, and adding a subset of channels from a third optical fiber to an output fiber carrying the undropped optical channels from the incoming fiber. In other words, OADMs are used for adding, dropping and exchanging optical channels in wavelength division multiplexing (WDM) systems. In WDM networks, each optical channel is designated a different wavelength, referred to as a wavelength channel. The introduction of OADMs in optical networks enables new and more efficient network architectures and provides for protection switching and dynamic provisioning.

In modern OADMs for use in optical communication networks, wavelength selective optical coupling between optical waveguides, particularly between optical fibers, is a key functionality.

In addition, wavelength selective optical couplers have proven to be useful outside the field of telecommunications, for example in applications such as spectroscopy, metrology and sensor interrogation systems.

A subclass of OADMs of particular interest is the reconfigurable OADM (ROADM). In ROADMs, there is a functionality that enables tuning or selection of the wavelength channel(s) to be dropped or added. The use of ROADMs provide operators of WDM networks greater network dynamics and the possibility of optimizing and adapting the network to the current traffic situation.

Despite the apparent advantages of ROADMs in network design, these devices have not yet become widely used. One main reason may be the cost currently associated with the construction and implementation of such devices, but there are also other issues. A good ROADM should exhibit low loss, particularly for those channels that are not dropped, the so-called express channels. It should also be able to operate over the entire relevant wavelength band, such as the C-band; have low channel cross-talk; be of a sufficiently small size; have low energy consumption, etc.

One additional criterion for ROADMs which may be important from a network operability point of view is that the ROADM should be "hitless". The feature of being hitless means that when changing the channel(s) to be dropped or added, all traffic carrying wavelength channels not involved in this change are left undistorted. Most often, this is considered from a power distortion point of view, but phase distortion, which may cause anomalous dispersion, can be equally detrimental.

The prior art has proposed a plethora of implementations that accomplish ROADM functionality.

The possibly most straightforward implementation proposed is to use a combination of two or more tunable three-port filters. A three-port filter (in the drop configuration) selects one or several wavelengths from a broadband, multi-wavelength signal entering at port 1 of the filter and passes the or each selected wavelength to filter port 3. Any remaining wavelengths from the broadband signal entering at port 1 leave the filter at port 2. In the add configuration, the same type of filter may be used, but the channels to be added are then fed into port 3, the express channels are fed into port 2, and the combined, multiplexed wavelength channels (expressed and added) leave the filter at port 1.

A three-port filter may be implemented, for example, using thin film interference filters (TTFs) together with fiber connected mirco-optics. A TTF is typically designed to reflect all wavelengths except a narrow wavelength range, which may be matched to the channel width of the wavelength channels at interest. By using a geometry wherein the angle of incidence of the beams hitting the TTF in not normal to the major plane of the interference filter, it is possible to separate the incoming light from the reflected light and thereby attain a three-port design. To make these three-port filters tunable, some mechanical means may be used for rotating the interference filter and thereby adjust the pass wavelength. However, TTF-based ROADMs are associated with several drawbacks. For example, the loss suffered by the express channels is relatively high and the tuning mechanisms are sensitive to vibrations. It has also proven to be very complicated and costly to provide for hitless tuning in TTF-based ROADMs.

Another implementation of a three-port filter is based on the use of fiber Bragg gratings (FBGs) in combination with optical circulators. Whereas a TTF-based filter is a band pass filter, the FBG-based filter is a band stop filter. To accomplish a wavelength drop, the incoming broadband signal is connected to port 1 of an optical circulator, and port 2 thereof is connected to one or several FBGs. The FBGs reflect wavelengths for the channels to be dropped, which return to port 2 of the circulator and leave the circulator at port 3. The express channels pass through the FBG(s). The add operation is accomplished by appending a second optical circulator after the FBGs. By adding wavelength channels at port 3 of this second circulator, they will be reflected by the FBGs and combine with the express channels passing through the same FBGs, and eventually leave the second circulator at port 2 thereof. In order to make the FBG-based filters tunable, use is typically made of a stretching or compressing mechanical force leading to a change of the stop band wavelengths. One major drawback of FBG-based three-port filters is that the optical circulators introduce significant loss. The circulators are also associated with a high cost. It has also proven to be problematic to make the FBGs tunable over the entire wavelength range of interest, and to make the filters hitless during tuning.

Another, quite different, approach uses a combination of array waveguide gratings (AWGs) together with 2×2 switches. A first AWG demultiplexes the incoming broadband optical signal into separate, wavelength specific waveguides. Each wavelength channel is then fed into an input port of a 2×2 switch that determines whether the wavelength channel is to be dropped or not if a wavelength channel is dropped, new information at the same wavelength may be added at the other input port of the 2×2 switch. Finally, a second AWG operates to recombine all wavelength channels, express and added, into an output fiber. One major drawback associated with this approach is that the demultiplexing/multiplexing operations introduce significant loss. Moreover, the required components are typically costly.

Yet another approach proposed in the prior art is the so-called broadcast-and-select method. In one version, a coupler is used for splitting the incoming broadband signal into two waveguides carrying the same information. One of the two signals is fed through a band pass filter, transmitting one or more channels to be dropped. The light in the second waveguide is fed through one or more wavelength blockers that block the same wavelengths that are dropped in the other waveguide. The add operation is then performed in a similar manner using a combination of filters and couplers. In order for this approach to provide a ROADM, the filters need to be tunable at least half a channel spacing. The loss suffered in a device according to this approach is significant, and typically amplifiers need to be introduced. The large number of components involved also make this an expensive and bulky approach.

In EP 1 535 096, there is disclosed a wavelength selective optical coupler based on resonant coupling of light from a waveguide, typically an optical fiber. In that device, portions of a first and a second optical fiber are provided with deflecting means, typically a tilted FBG. The deflecting means directs some of the light propagating in the fiber into a narrow lobe protruding out of the fiber in a direction being close to orthogonal to the propagation direction of light within the fiber. The two fibers are placed adjacent and parallel to each other in the plane of the protruding lobes of deflected light, and with the deflecting portions arranged such that an overlap between the protruding lobes is obtained. Further, the device comprises an external resonator formed by two highly reflecting mirrors outside the two fibers, the external resonator being arranged such that the resonator modes are essentially in the same geometrical plane as the lobes from the deflecting portions. The working principle of this coupler is as follows. The tilted FBG deflects some (typically a few percent of the light) of the broadband light propagating in the first fiber into the external resonator. Light of a wavelength that is in resonance with the external resonator will, after one round trip in the resonator, interfere constructively with subsequently deflected light of the same wavelength. Thus, a resonantly enhanced coupling of such wavelength is achieved, and substantially all light of that wavelength will couple to the resonator mode. Since the resonator mode overlaps with the deflecting portion of the second fiber, light of the resonant mode will be coupled into this second fiber. Under certain conditions, most of the light in the resonant mode will in fact be coupled to the second fiber. By adjusting the separation between the mirrors of the external resonator, it is possible to tune the wavelength to be coupled to the second fiber.

The separation between two wavelengths that fulfill the resonance condition is called the free spectral range (FSR) and is determined by the separation between the mirrors of the resonator. In order to be able to select only one wavelength at the time using the resonant coupler of EP 1 535 096, the FSR must be larger than the bandwidth of the broadband signal involved in the coupling. In a typical WDM system, the width of a wavelength band is in the order of 40 nm. To accomplish an FSR of about 40 nm, the separation between the mirrors of the resonator needs to be about 20 μm. In order for two fibers to fit into such resonator, the diameter of each fiber must be less than about 10 μm. Hence, it is clear that the small separation required between the mirrors of the external resonator leads to quite some challenges from a manufacturing standpoint.

SUMMARY OF THE INVENTION

Thus, it is an object of the present invention to provide improvements of the art described above, and in particular to overcome the problems related to the small separation required between mirrors of the external resonator, and in general to address the geometrical problems associated with transverse coupling of light from a first waveguide to a second waveguide.

This object is achieved by a device according to the appended claims.

Hence, the present invention is based upon an understanding that by selecting a well-defined, curved shape for at least one of the reflecting elements that constitute the external resonator or by providing suitable refractive portions or components, it is possible to create resonator modes that may couple light to, or be excited from, a deflecting portion of a first waveguide and simultaneously be excited from, or couple light to, a deflecting portion of a second waveguide, wherein the waveguides define a geometrical plane substantially parallel to the resonator mirrors. Hence, according to the present invention, the coupling between the waveguides is achieved while having the second waveguide positioned well outside the geometrical plane defined by the protruding lobes from deflecting portions of the first waveguide.

Thus, in coarse terms, the present invention proposes to couple light between waveguides by extracting light from the first waveguide in a first direction, generally perpendicular to the propagation direction for light within the waveguide, such that the extracted light enters a mode in the external resonator. The external resonator is designed such that the mode(s) have an extension in a lateral direction, being more or less perpendicular to both the first, extraction direction and to the propagation direction of light within the waveguide. Further, at least one mode of the external resonator overlaps with a corresponding coupling portion of the second waveguide, said second waveguide being located adjacent the first waveguide. The lateral extension of the (bound) mode in the external resonator is obtained by having at least one of the resonator mirrors appropriately curved or by incorporating refractive elements or portions in the external resonator. In this manner, it is not necessary for the two waveguides to be placed next to each other on a line going from one resonator mirror to the other (i.e. in the direction of the protruding light lobes).

Hence, the inventive design enables a new coupler geometry, wherein light is resonantly coupled out from the first waveguide and into a resonator mode, said resonator mode also overlapping with the second waveguide thereby enabling resonant coupling of light into said second waveguide. For the same FSR of the external resonator, the inventive geometry allows the waveguides (e.g. optical fibers) to be of twice the diameter or size compared to the prior art.

In one embodiment, the present invention provides a spectrally selective optical coupler, comprising a first optical fiber having a core and a cladding. Along a portion of said core, there is provided a deflector operative to deflect at least some of the light propagating in said core. The deflector is arranged such that the light is deflected out from the fiber laterally at an angle close to, but preferably not exactly, orthogonal to the propagation direction within said core. An external resonator is provided, comprising two highly reflecting elements (mirror elements). The first optical fiber is located between the two reflecting elements. Light coupled out from the optical fiber at the deflector portion thereof will enter the external resonator and excite a resonant mode therein, provided that the wavelength of the outcoupled light falls within a predetermined, typically very narrow, wavelength range and that the injection angle into the external resonator corresponds to a certain angle range. The resonant wavelength will generally be determined by the separation between the reflecting elements of the resonator. In addition, this embodiment of the inventive optical coupler comprises a second optical fiber, also having a core and a cladding, and being equipped with a deflecting portion much like the first fiber. This second optical fiber is also located between the reflective elements of the external resonator, in a position parallel to the first fiber but outside of the geometrical plane defined by the light lobe of the deflecting portion of the first fiber. Preferably, the two optical fibers are placed sufficiently far apart in order for direct evanescent coupling between the fibers to be negligible. Further, the surface shape of at least one of the resonator mirrors (the reflecting elements) is designed such that the resonator exhibits at least one bound resonator mode that overlaps with the deflecting portions in both the first and the second fiber.

In an alternative embodiment, the mirrors defining the external resonator are both substantially flat, and the lateral extension of the resonator mode(s) is effected by means of refractive elements and/or refractive portions within the external resonator. As will be understood, it is also possible to utilize a combination of a curved mirror and refractive portions for the external resonator.

The external resonator according to the present invention will typically exhibit several resonant modes, meaning that the behavior and the wavelength characteristics will be more complex than if only one single mode were supported. However, it can be shown that it is possible to make all resonator modes except one lossy. Thereby, although light from the deflecting portion of the first waveguide (fiber) within a particular wavelength range may excite such lossy resonator mode, only a very small and in practice negligible amount of light will couple to the resonator mode, since the build-up of a resonance is prevented by the losses.

Preferably, a blazed Bragg grating is used for deflecting light out from the fiber core. It is particularly preferred to use an apodized, blazed Bragg grating for this purpose. Such apodized grating preferably has the properties of a band pass filter approaching a top-hat spectral characteristic. In the spatial domain, such filter transforms into a sinc-like function. Normally, only a portion of the sinc-function is used, since it is often the desire to keep the length of the deflecting grating to a minimum. This may be accomplished by truncating the side lobes of the sinc-like function and weighing it with a Kaiser window function. The use of an apodized Bragg grating provides good suppression of group delay ripple for a wide wavelength range.

Any light coupled out at the deflecting portion of the first waveguide into the surrounding medium will leave the fiber at slightly different angles, depending on wavelength, as known in the art. It is preferred that the period of the blazed Bragg grating constituting the deflecting portion is selected such that light coupled out from the waveguide exits at an angle that is close to, but not exactly, orthogonal to the propagation direction within the waveguide (e.g. along a fiber core axis). The reason for avoiding the specific case of light being coupled in the orthogonal direction is that outcoupled light in such case could couple back into the same waveguide upon a subsequent pass over the deflecting portion of the waveguide.

Preferably, the separation between the reflecting elements of the external resonator is controllable, e.g. by means of electrostatic tuning. Improved tuning capabilities may be obtained for an embodiment in which at least one of the reflecting elements is divided into several reflective subsections, wherein each subsection is individually controllable with respect to the second, opposing reflective element of the resonator. In this manner, it is possible to control the efficiency of coupling from the first waveguide to the second waveguide, and to compensate for any imperfections in the shape of the resonator.

In many applications, and in particular for ROADMs, it is a desire to change the wavelength to be coupled between the waveguides without disturbing other wavelengths during the tuning operation, so-called hitless tuning. Hitless tuning can be achieved if, before the separation between the reflecting elements of the external resonator is adjusted to correspond to a new resonant wavelength, the reflecting elements are tilted such that there are no sufficiently resonant modes present for the external resonator to provide efficient outcoupling. Then, in a condition for the external resonator where no sufficiently resonant modes are present, the separation is adjusted and finally the reflective elements are tilted back so that resonance is again achieved, now for the new wavelength.

In some cases, the deflecting means in the waveguides may be polarization dependent. For highly polarization dependent elements, which is the case for a blazed Bragg grating, and when the outcoupling angle is close to orthogonal to the propagation direction within the waveguide, only light of a certain polarization will be coupled into the external resonator. Therefore, in order to couple all light regardless of its state of polarization, it is preferred to have the coupler divided into two sections, wherein a first section is adapted to couple a first polarization state and a second section is adapted to couple the orthogonal polarization state. For example, this may be achieved by having the second blazed Bragg grating rotated over 90 degrees about the waveguide, such that an orthogonal, plane state of polarization is taken care of.

BRIEF DESCRIPTION OF THE DRAWINGS

Specific embodiments of the invention will be described in greater detail in the following, with reference to the accompanying drawings, on which.

DETAILED DESCRIPTION

Figure 1:
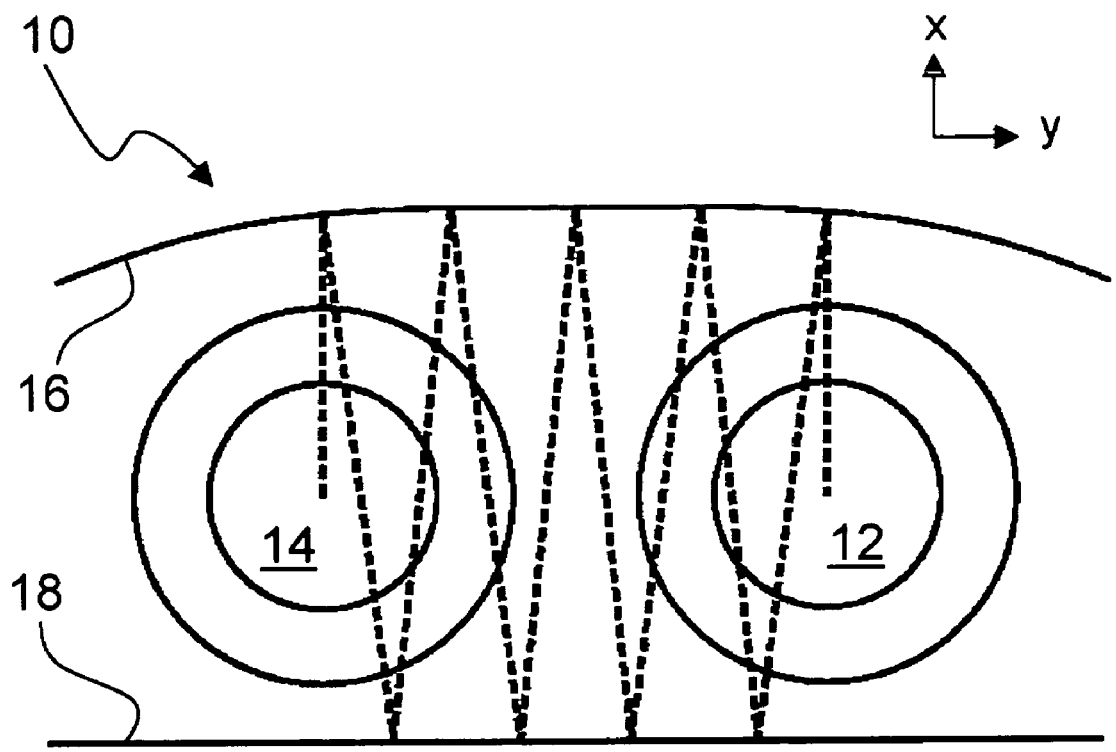
FIG. 1 schematically shows a first embodiment of the spectrally selective optical coupler according to the present invention.

FIG. 1 schematically shows an optical coupler 10 according to the present invention. The coupler comprises a first and a second waveguide 12, 14, and an external resonator defined by a first and a second mirror 16, 18. It should be understood that only those parts required for explaining the principles of the invention are shown, additional parts typically being required to implement an actual working device, as will be appreciated.

By way of introduction, some generic principles of the invention will be described. In order to make the description even more clear, a Cartesian coordinate system (x, y, z) is defined, such that for the present invention the propagation direction of light in the waveguides 12, 14 is along the z-direction, the separation between the waveguides is along the y-direction, and the separation between the resonator mirrors 16, 18 is along the x-direction. This is most easily seen by referring to the figures.

A fundamental difference between the present invention and the prior art disclosed in EP 1 535 096 may now be readily understood. While the two waveguides according to EP 1 535 096 were arranged adjacent each other in the x-direction, i.e. in the direction of the mirror separation, thus requiring a separation between the mirrors at least twice the waveguide diameter, the two waveguides 12, 14 (e.g. fibers) of the present invention are arranged adjacent each other in the y-direction to define a geometrical plane generally parallel to the plane of the external resonator mirrors 16, 18. Thus, the required separation between the two resonator mirrors 16, 18 according to the present invention is only one time the diameter of the waveguides. For a given free spectral range (FSR) of the external resonator (i.e. for a given separation between the mirrors 16, 18), the diameter of the waveguides 12, 14 may thus be doubled. Alternatively, for the same waveguide diameter as in the referenced prior art, the FSR of the external resonator may be doubled by reducing the mirror separation to half.

In order to define a resonant mode in the external resonator overlapping both waveguides, the external resonator is designed to have a resonant mode with an extension in the y-direction. Such mode is schematically illustrated by the dotted lines in the figures. Such resonant mode, having an extension in the y-direction, is obtained by appropriate curvature for at least one of the resonator mirrors (e.g. mirror 16) and/or by including refractive elements or portions in the external resonator.

Hence, in order to couple light from one waveguide to the other, light is deflected out from the first waveguide generally in the x-direction towards one of the resonator mirrors. Since one of the resonator mirrors is curved and/or since there are refractive elements in the resonator (or equivalently, since the resonant mode of the external resonator has an extension in the y-direction), this light coupled out from the first waveguide will, through multiple reflections from the resonator mirrors, travel laterally in the y-direction towards the second waveguide and become coupled into this second waveguide by means of a deflector therein.

It is particularly preferred that the mode of the external resonator is a bound mode, such that substantially no light will escape to the sides in the y-direction. This is conveniently accomplished by way of appropriate curvature of the resonator mirror, as schematically shown in the Figures.

It is preferred that the propagation of light coupled out from either waveguide has a small component in the z-direction. It should be understood that the light undergoes a large number of reflections from the resonator mirrors during coupling from one waveguide to the other. Hence, after one round-trip in the external resonator, any light coupled from one of the waveguides will return to a position close to the deflecting portion of the same waveguide. Therefore, in order to avoid excess coupling of light back into the same waveguide, a small z-component is preferably given to the outcoupled light. Thereby, after one or a few round-trips, the outcoupled light will have passed the deflecting portion of the waveguide and will continue its trip towards the second waveguide without being coupled back into the originating waveguide. It will be understood that, if this principle is implemented, corresponding deflection portions in the two waveguides will have to be slightly displaced in the z-direction.

The embodiment shown in FIG. 1 is a comparatively simple solution, wherein one of the resonator mirrors 16 is slightly curved at its edges, leaving a substantially flat portion at the midsection in the y-direction between the waveguides.

Figure 2:
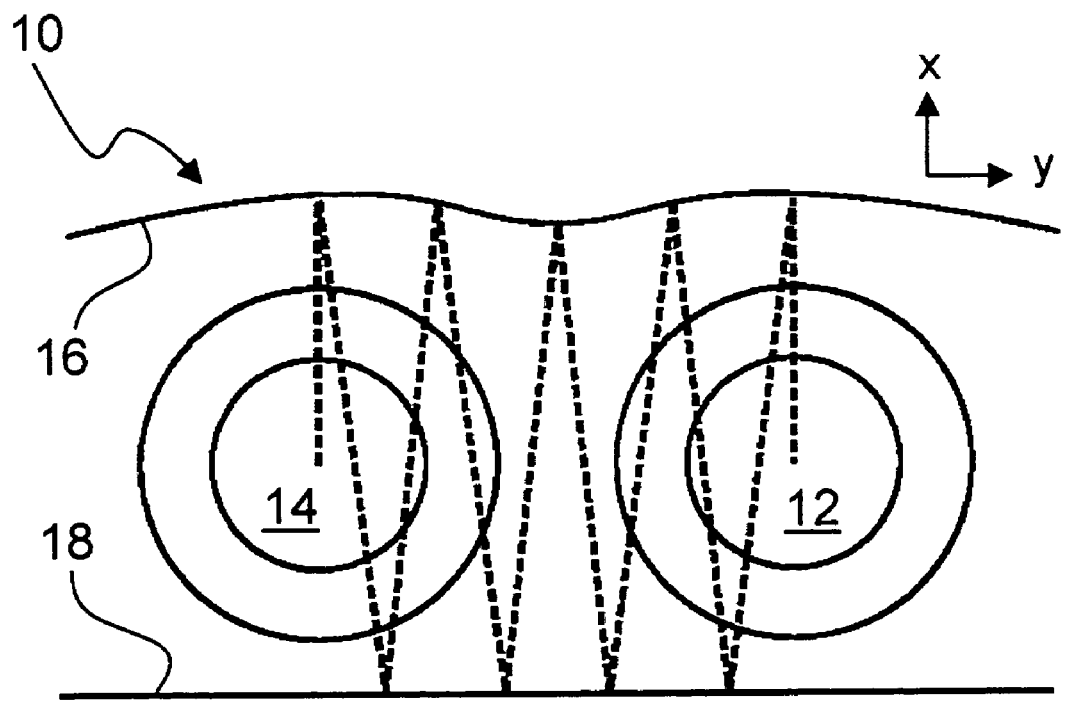
FIG. 2 schematically shows a second embodiment of the invention, comprising an alternatively shaped resonator mirror.

A more advanced embodiment is illustrated in FIG. 2. By using a more complex shape for the external resonator, better control of the resonant mode may be obtained. For example, the waveguides may be placed further apart and still overlap efficiently with the resonant mode.

Figure 3:
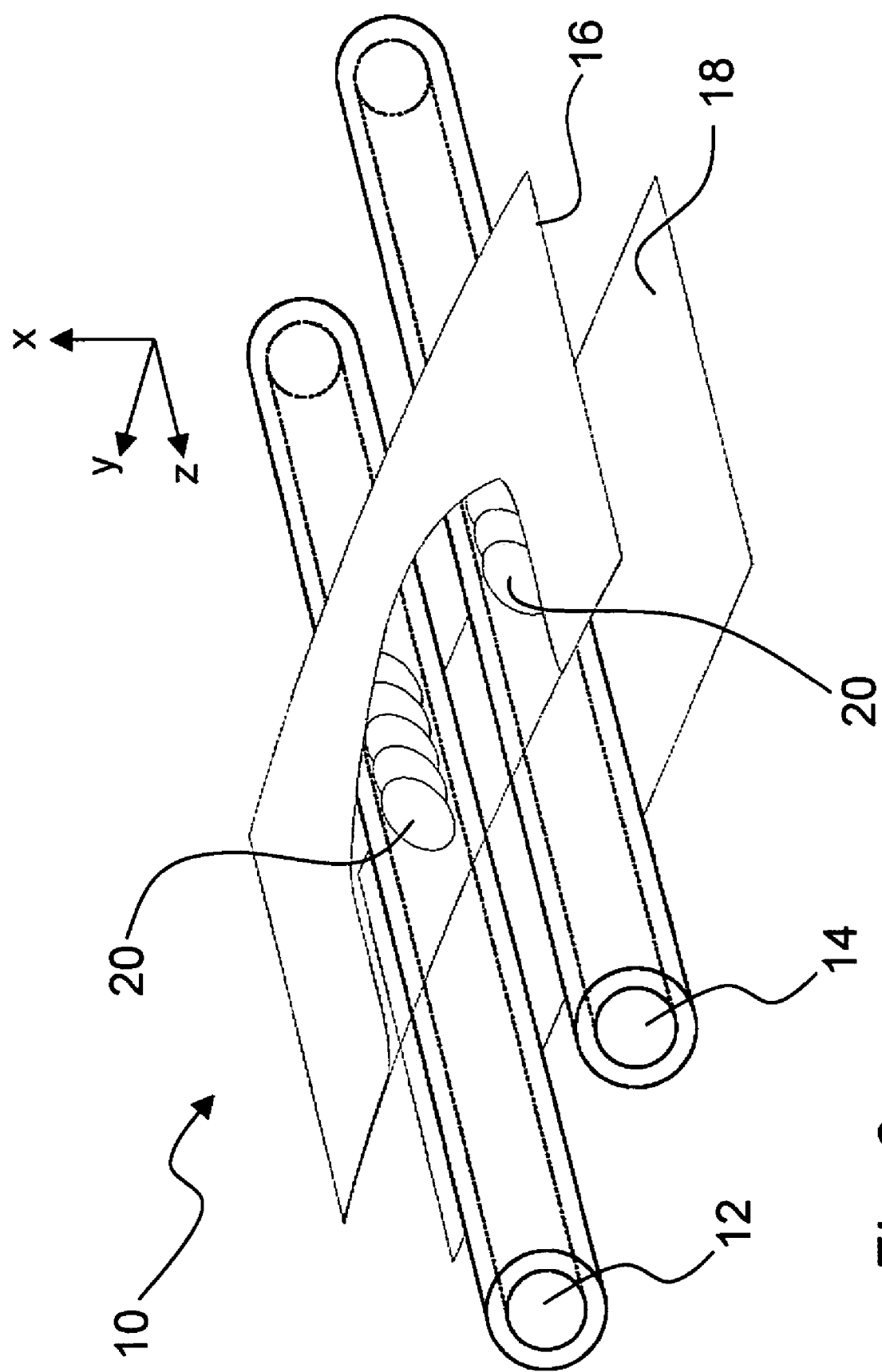
FIG. 3 is a schematic perspective view of an optical coupler according to the invention.

A schematic perspective view of the inventive coupler is shown in FIG. 3. From this figure, it is readily understood how the present invention allows the diameter of the waveguides (e.g. optical fibers) to be twice as large compared to the prior-art coupler disclosed in EP 1 535 096. In FIG. 3, one of the resonator mirrors is shown in cutout, in order to reveal the deflecting portions 20 within the waveguides 12 and 14.

Figure 4:
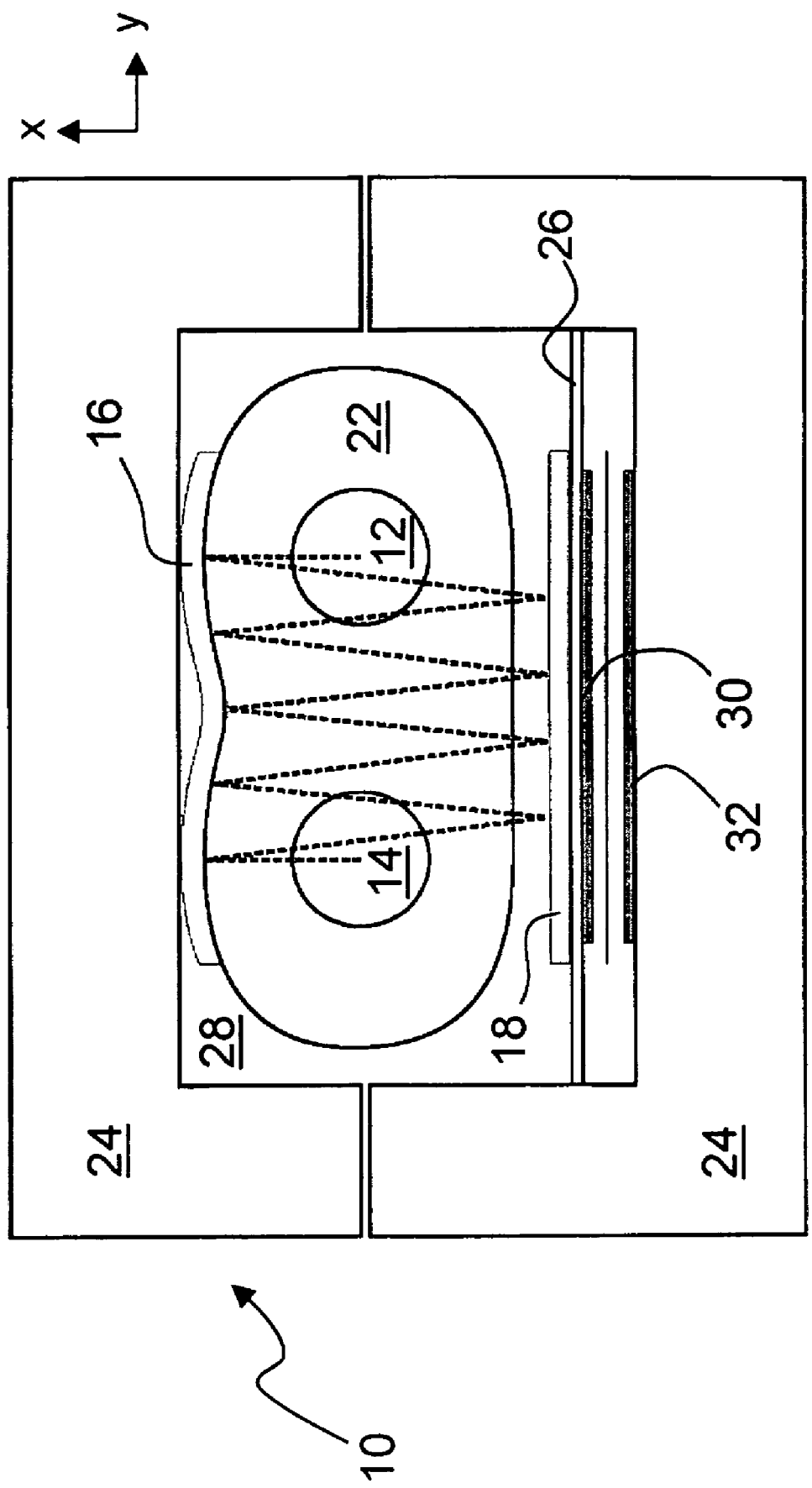
FIG. 4 schematically shows an embodiment similar to that of FIG. 2, implemented by using a dual-core optical fiber.

FIG. 4 shows an embodiment of the inventive coupler 10 implemented by the use of a dual-core fiber. From a manufacturability point of view, an advantageous way of accomplishing the curved mirror 16 of the external resonator is by employing a dual-core optical fiber. Starting from a compound preform having precursors for two cores a sufficient distance apart from each other, this preform may be machined to a desired shape. From this preform, a fiber is drawn using standard fiber drawing technology, providing an optical fiber having an outer shape for the cladding 22 of the desired curvature for one of the resonator mirrors 16. Such curvature is conveniently provided on a side of the fiber that is generally parallel to the plane defined by the two cores 12, 14. The opposite side of the fiber cladding may be flat. Optionally, the final curvature or shape of the fiber cladding may be accomplished in a subsequent step in which the fiber is etched or shaped by means of some other suitable technique. To provide the curved resonator mirror for the inventive device, the curved or shaped side of the fiber cladding is provided with a reflecting layer, e.g. a metal layer or a dielectric stack (shown at 16 in FIG. 4).

To provide mechanical stability and robustness for the device, the dual-core fiber is preferably placed in a fixation block 24, which may be made from silicon or other material that can be precision machined. Such fixation block may be provided with a membrane 26 or the like, for supporting the second resonator mirror 18, which may also be a dielectric stack or a metal layer mirror.

The regions 28 between the fixation blocks and the dual-core fiber is preferably filled with a refractive index matching padding material. Further, part of the region 28 may be an airgap in order to facilitate the movement of the membrane 26.

By locating electrodes 30 on or adjacent to such membrane, the exact position of the second resonator mirror 18 may be controlled electrically, conveniently providing tunability for the device. By altering the lateral position of the membrane 26 and the mirror 18 provided thereupon, the separation between the resonator mirrors 16, 18 may be accurately controlled, thus providing a means for controlling the wavelength to be resonantly coupled from one waveguide to the other. The electrode 30 provided on the membrane 26 is actuated by means of a counter electrode 32 attached to a fixed portion of the fixation structure 24.

Further, by having several electrodes 30, not only the lateral position, but also the angle with respect to the other resonator mirror 16 may be controlled. In that way, hitless tuning may be provided. It is preferred that the mirror 18 is tilted during tuning, such that the separation between the resonator mirrors is not constant along the deflective portion of the waveguide. Thereby, no wavelength will be able to build up a resonance within the external resonator, and hence there will be only a very limited amount of light coupled out from the first waveguide. Changing the coupling wavelength, for instance in a drop configuration, will then preferably be accomplished using the following steps: (i) the membrane 26 (and the mirror 18) is tilted, such that no wavelength is resonant in the external resonator; (ii) the separation between the two mirrors 16, 18 of the external resonator is changed, to generally suit a new coupling wavelength; and (iii) the membrane 26 (and the mirror 18) is tilted back to a position that provides for resonance for the new coupling wavelength.

In order to provide for polarization independent coupling of light between two waveguides, use is preferably made of two optical couplers 10 arranged in sequence, wherein the first coupler operates on a first state of polarization, and the second coupler operates on a second, orthogonal state of polarization. A person of ordinary skill in the art will understand the manner in which this could be implemented. However, a preferred way of providing the polarization independent coupling is to assemble two couplers of the kind shown in FIG. 4 in the same orientation comparatively close together (typically a few centimeters apart or less) over the same dual-core fiber, and then to rotate the two couplers over a mutual angle of 90 degrees while keeping the fiber stationary relative to each coupler. Then, the piece of fiber between the two coupling blocks will become twisted 90 degrees over a comparatively short distance, leading to a situation where the state of polarization of light propagating in the fiber will not have time to rotate with the twist. Thus, the second coupler will act upon a polarization state that is orthogonal to that acted upon by the first coupler.

In general, and as will be appreciated by a person of ordinary skill in the art, the curved mirror 16 of the external resonator may be replaced by, or combined with, refractive elements or portions within the external resonator for obtaining the lateral extension of the resonator mode(s) such that an overlap of both waveguides is obtained.

CONCLUSION

A spectrally selective optical coupler is disclosed, comprising a first and a second waveguide; an external resonator defined by at least a first and a second mirror; and a respective deflecting portion in each of said waveguides for coupling light between the waveguide and the external resonator. The waveguides are arranged between the mirrors adjacent to each other in a plane that is generally parallel to said mirrors; and the external resonator is designed such that a resonant mode within the external resonator overlaps the deflecting portion in the first and the second waveguide. The inventive coupler solves some limiting geometrical problems encountered in the prior art. A lateral extension of a mode in the external resonator overlapping both waveguides is obtained using a curved resonator mirror or refractive elements or portions within the resonator.

The invention claimed is:

1. A spectrally selective optical coupler, comprising
a first and a second waveguide;
an external resonator defined by at least a first and a second mirror;
a respective deflecting portion in each of said waveguides for resonantly coupling light between the waveguide and the external resonator;
wherein the waveguides are arranged between the said mirrors adjacent to each other in a plane that is generally parallel to said mirrors; and
wherein the external resonator is designed such that a resonant mode within the external resonator overlaps the deflecting portion in the first and the second waveguide.

2. The coupler of claim 1, wherein a lateral extension of at least one mode in the external resonator overlapping the deflecting portion in the first and the second waveguide is defined by means of having at least one of the resonator mirrors appropriately curved and/or by means of refractive portions or elements located in the external resonator.

3. The coupler of claim 1, further comprising means for changing a separation between the first and the second mirror.

4. The coupler of claim 1, further comprising means for tilting at least one of the mirrors with respect to the other mirror.

5. The coupler of claim 1, wherein one of the resonator mirrors is provided on a membrane, and further comprising at least one electrode on said membrane enabling electrostatic control of the position and/or tilt of said membrane and the mirror provided thereupon.

6. The coupler of claim 1, wherein the first and the second waveguide are implemented in the form of a dual-core optical fiber.

7. The coupler of claim 6, wherein a curved resonator mirror is implemented by means of a reflecting layer provided upon a similarly curved cladding surface of said dual-core fiber.

8. The coupler of claim 6, wherein the dual-core fiber is mounted in a fixation block, said fixation block comprising a fixed part and a movable membrane part, one of said resonator mirrors being provided on said membrane part, and the fixation block further comprising a pair of electrodes, one on the fixed part and one on the membrane part, for electrostatic adjustment of the position and/or tilt of said membrane and the mirror provided thereupon.

9. The coupler of claim 8, comprising several electrodes for improved controllability of the position and/or tilt of said membrane and the mirror provided thereupon.

10. A spectrally selective optical coupling arrangement, comprising two spectrally selective couplers as defined in claim 1, wherein said two couplers are arranged to operate on two mutually orthogonal states of polarization.

11. The coupler of claim 2, further comprising means for changing a separation between the first and the second mirror.

12. The coupler of claim 2, further comprising means for tilting at least one of the mirrors with respect to the other mirror.

13. The coupler of claim 3, further comprising means for tilting at least one of the mirrors with respect to the other mirror.

14. The coupler of claim 2, wherein one of the resonator mirrors is provided on a membrane, and further comprising at least one electrode on said membrane enabling electrostatic control of the position and/or tilt of said membrane and the mirror provided thereupon.

15. The coupler of claim 3, wherein one of the resonator mirrors is provided on a membrane, and further comprising at least one electrode on said membrane enabling electrostatic control of the position and/or tilt of said membrane and the mirror provided thereupon.

16. The coupler of claim 4, wherein one of the resonator mirrors is provided on a membrane, and further comprising at least one electrode on said membrane enabling electrostatic control of the position and/or tilt of said membrane and the mirror provided thereupon.

17. The coupler of claim 2, wherein the first and the second waveguide are implemented in the form of a dual-core optical fiber.

18. The coupler of claim 3, wherein the first and the second waveguide are implemented in the form of a dual-core optical fiber.

19. The coupler of claim 4, wherein the first and the second waveguide are implemented in the form of a dual-core optical fiber.

20. The coupler of claim 5, wherein the first and the second waveguide are implemented in the form of a dual-core optical fiber.

* * * * *